(12) United States Patent
Huang et al.

(10) Patent No.: US 8,982,289 B2
(45) Date of Patent: Mar. 17, 2015

(54) PROJECTION DISPLAY DEVICE

(75) Inventors: Cheng Huang, Shanghai (CN); Lei Zhang, Shanghai (CN); Deming Tang, Shanghai (CN)

(73) Assignee: Lexvu Opto Microelectronics Technology (Shanghai) Ltd, Shanghai (CN)

( * ) Notice: Subject to any disclaimer, the term of this patent is extended or adjusted under 35 U.S.C. 154(b) by 197 days.

(21) Appl. No.: 13/703,198

(22) PCT Filed: Dec. 15, 2010

(86) PCT No.: PCT/CN2010/079816
§ 371 (c)(1),
(2), (4) Date: Dec. 10, 2012

(87) PCT Pub. No.: WO2011/153801
PCT Pub. Date: Dec. 15, 2011

(65) Prior Publication Data
US 2013/0076995 A1    Mar. 28, 2013

(30) Foreign Application Priority Data
Jun. 12, 2010  (CN) .......................... 2010 1 0200690

(51) Int. Cl.
*G02F 1/1335*    (2006.01)
*G03B 21/20*    (2006.01)
(Continued)

(52) U.S. Cl.
CPC ............ *G03B 21/2073* (2013.01); *G02B 27/26* (2013.01); *G02B 27/283* (2013.01); *G03B 21/14* (2013.01); *H04N 9/3167* (2013.01);
(Continued)

(58) Field of Classification Search
USPC ........................................... 349/5–9
See application file for complete search history.

(56) References Cited

U.S. PATENT DOCUMENTS 5,861,927 A * 1/1999 Suzuki et al. ...................... 349/5
6,536,902 B2   3/2003 Lee
(Continued)

FOREIGN PATENT DOCUMENTS

CN           1847971 A    10/2006
CN         101666962 A    3/2010
(Continued)

OTHER PUBLICATIONS

International Search Report and Written Opinion for PCT/CN2010/079816, mailed Mar. 17, 2011; ISA/CN.

*Primary Examiner* — Richard Kim
*Assistant Examiner* — Kendrick Hsu
(74) *Attorney, Agent, or Firm* — Harness, Dickey & Pierce, P.L.C.

(57) ABSTRACT

A projection display device includes a first display panel (23a), a second display panel (23b), a PBS (Polarization Beam Splitter) (22) with a first surface (22a) and a second surface (22b) opposite each other, a light recycling device (25a, 25b and 23b), and a projection lens (24). The PBS (22) transmits a first type parallel polarized light and reflects a second type parallel polarized light. The light recycling device (25a, 25b and 23b) transforms the first type parallel polarized light transmitted by the PBS (22) into the second type parallel polarized light which carries a second image information, then reversely transmits the second type parallel polarized light to the second surface (22b) of the PBS (22). The projection display device improves the light utilization efficiency and can be used for 3D display.

16 Claims, 2 Drawing Sheets

(51) Int. Cl.
  *G02B 27/26* (2006.01)
  *G02B 27/28* (2006.01)
  *G03B 21/14* (2006.01)
  *H04N 9/31* (2006.01)
  *H04N 13/04* (2006.01)
  *G02F 1/13* (2006.01)

(52) U.S. Cl.
  CPC ......... *H04N9/3197* (2013.01); *H04N 13/0434* (2013.01); *H04N 13/0443* (2013.01); *H04N 13/0459* (2013.01); *G02F 1/1313* (2013.01)
  USPC .................................................. 349/9; 349/8

(56) References Cited

U.S. PATENT DOCUMENTS

| | | |
|---|---|---|
| 8,134,109 B2 | 3/2012 | Tang |
| 2005/0185139 A1 | 8/2005 | Yamanaka et al. |
| 2010/0171890 A1* | 7/2010 | Furukawa et al. ................. 349/9 |

FOREIGN PATENT DOCUMENTS

| | | |
|---|---|---|
| CN | 101702072 A | 5/2010 |
| EP | 0560636 A1 | 9/1993 |
| JP | 2000347323 A | 12/2000 |

* cited by examiner

PROJECTION DISPLAY DEVICE

CROSS-REFERENCE TO RELATED APPLICATIONS

The present application is a 371 National Stage Application of International Application No. PCT/CN2010/079816, filed on Dec. 15, 2010, which claims the priority of Chinese Patent Application No. 201010200690.7, entitled "Projection Display Device", and filed Jun. 12, 2010, the entire disclosures of which are incorporated herein by reference.

FIELD OF INVENTION

The present invention relates to the field of optical instrument, and particularly relates to a projection display device.

BACKGROUND OF THE INVENTION

With the development of multimedia technology, micro projection display devices are widely used inside cell phones, digital cameras, portable projectors and other handheld devices, for amplifying and projecting images.

FIG. 1 schematically shows a conventional projection display device, which mainly includes a light source device 10, an illumination system 11, a Polarization Beam Splitter (PBS) 12, a display panel 13 and a projector lens 14. A conventional display panel (Liquid Crystal Display) is a transmission-type display device, while an LCOS (Liquid Crystal on Silicon) is a reflection-type display device which reflects incident light to display images. The working principle of an LCOS display device is described here. A natural light beam is emitted by the light source device 10. The illumination system 11 receives the natural light, which is then transformed to parallel polarized light including p-polarized light and s-polarized light by the PBS 12. The PBS 12 forms an angle with respect to the first direction (x-axis), and transmits one of the two types of parallel polarized light and reflects the other. For example, the PBS 12 transmits the p-polarized light (polarized direction is parallel to the rays incident plane) and reflects the s-polarized light (polarized direction is vertical to the rays incident plane). The s- or p-polarized light are defined relative to the plane of incidence of the ray on the surface, which are not characteristics of the beam itself but just two types of parallel polarized light out of PBS in this invention. The s-polarized light is incident into the surface of the display panel 13, and is transformed to p-polarized light by the LCOS for being reflected back to the PBS 12. Since the PBS 12 transmits the p-polarized light, the p-polarized light passes through the PBS 12 and further into the projector lens 14. By amplifying, the projector lens 14 projects to the outside the image generated by the display panel 13.

A conventional projection display device only uses the reflected parallel polarized light from the PBS 12 to project image, and the transmitted parallel polarized light is wasted. Therefore, the light utilization efficiency is low, commonly less than 10%, which leads to a poor image quality under fixed-power of the light source device 10.

In the Chinese patent application No. 200910172326.1, aspherical lenses and cylinder lenses are adapted to adjust the light beam from a light source device before transmission, which generates a light spot matching the LCOS shape. This method improves the light utilization efficiency to a certain degree. However, since it provides a similar structure as shown in FIG. 1, which uses only one type of polarized light, the light utilization efficiency is still low.

SUMMARY OF THE INVENTION

A primary object of the invention is to provide a projection display device which improves light utilization efficiency and image quality.

In order to achieve the above object, the present invention provides a projection display device. The projection display device includes a first display panel, a PBS having a first surface and a second surface opposite to each other, a light recycling device, and a projector lens. The PBS is adapted to transmit a first type parallel polarized light and to reflect a second type parallel polarized light. The first display panel is adapted to transform the second type parallel polarized light, which is reflected by the first surface of the PBS, to the first type parallel polarized light which carries a first image information, and is adapted to reflect the first type parallel polarized light, which carries a first image information, to the first surface of the PBS. The light recycling device is adapted to transform the first type parallel polarized light, which is transmitted by the PBS, to the second type parallel polarized light which carries a second image information, and is adapted to reversely transmit the second type parallel polarized light to the second surface of the PBS. The projector lens is adapted to receive the first type parallel polarized light, which is transmitted by the PBS and carries the first image information, and the second type parallel polarized light, which is reflected by the PBS and carries the second image information.

Preferably, an incident surface of the projector lens faces the first display panel. The PBS is located between the projector lens and the first display panel.

Preferably, the light recycling device includes light recycling components and a second display panel. The light recycling components are adapted to transform the first type parallel polarized light transmitted by the PBS to the second type parallel polarized light, and are adapted to reflect the second type parallel polarized light to the second display panel. The second display panel is adapted to transform the second type parallel polarized light to the first type parallel polarized light which carries the second image information, and is adapted to reflect the first type parallel polarized light to the light recycling components. The light recycling components are adapted to transform the first type parallel polarized light which carries the second image information to the second type parallel polarized light which carries the second image information, and are adapted to reflect the second type parallel polarized light to the second surface of the PBS.

Preferably, the light recycling components include a reflector and a quarter-wave plate located on the surface of the reflector. The reflector and the quarter-wave plate are parallel to the PBS. An incident surface of the reflector faces the second display panel.

Preferably, the light recycling components include a right-angle prism. The 45-degree right-angle prism has a first right-angle surface, a second right-angle surface and a hypotenuse surface. The first right-angle surface and the second right-angle surface are transmitting surfaces. The hypotenuse surface is a reflecting surface. The second right-angle surface is parallel to the second display panel. The hypotenuse surface is parallel to the PBS. A half-wave plate is located on the first right-angle surface. The first type parallel polarized light transmitted by the PBS is incident into the first right-angle surface.

Preferably, the light recycling components include a right-angle prism. The right-angle prism has a first right-angle surface, a second right-angle surface and a hypotenuse surface. The first right-angle surface and the second right-angle surface are transmitting surfaces. The hypotenuse surface is a reflecting surface. The second right-angle surface is parallel to the second display panel. The hypotenuse surface is parallel to the PBS. A half-wave plate is located on the first right-angle surface. The first type parallel polarized light transmitted by the PBS is incident into the first right-angle surface.

Preferably, the light recycling components include a right-angle prism. The right-angle prism has a first right-angle surface, a second right-angle surface and a hypotenuse surface. The first right-angle surface and the second right-angle surface are transmitting surfaces. The hypotenuse surface is a reflecting surface. The second right-angle surface is parallel to the second display panel. The hypotenuse surface is parallel to the PBS. A half-wave plate is located on the second right-angle surface. The first type parallel polarized light transmitted by the PBS being incident into the first right-angle surface.

Preferably, the first display panel and the second display panel are two parts of a same display panel.

Preferably, the first display panel and the second display panel are LCOS panels.

Preferably, the first image information and the second image information are identical.

Preferably, the first image information is left-eye image, and the second image information is right-eye image.

Preferably, the projection display device also comprises a light source device and an illumination system. The illumination system transforms natural light emitted by the light source device to parallel light.

Preferably, the PBS is metal grating, PBS prism, PBS plate or PBS film.

Compared to the prior art, the present invention has the benefits as follows:

The projection display device of the present invention uses light recycling device to recycle a polarized light transmitted by the PBS, to transform it to a polarized light that carries the second image information, and to reversely transmit the result polarized light to the PBS. The polarized light is then reflected to the incident surface of the projector lens. The projection display device of the present invention substantially improves the light utilization efficiency.

Furthermore, the images generated by the first display panel and by the second display panel of the present invention can be the same, which means the polarized light recycled by the light recycling device strengthens the images. Also, the images generated by the first display panel and by the second display panel can be the left-eye image and right-eye image respectively. Therefore, the final image projected by the projector lens is the combination of the two images, thus achieving the effect of three-dimensional display.

DESCRIPTION OF THE PREFERRED EMBODIMENTS

Hereunder, the present invention will be described in detail with reference to embodiments, in conjunction with the accompanying drawings.

In a projection display device of prior art, the natural light is transformed by an illumination system to parallel light, which is then transformed to parallel polarized light by a PBS including p-polarized light and s-polarized light. One of the two polarized light is reflected by the PBS to a display panel and further to a projector lens, the other is wasted. In this way, the light utilization efficiency for the projection display device is low, which leads to a poor image quality.

The present invention uses a light recycling device to recycle the polarized light transmitted by the PBS, to transform it to a polarized light which carries second image information, and to reversely transmit it to the PBS. The PBS then reflects the polarized light back to the incident surface of the projector lens. In this way, light utilization efficiency is improved remarkably.

The present invention also implements a first display panel and a second display panel. If the images generated by the first display panel and the second display panel are the same, the final image is strengthened. If their images are left-eye image and right-eye image, it could achieve 3D effects.

Figure 1:
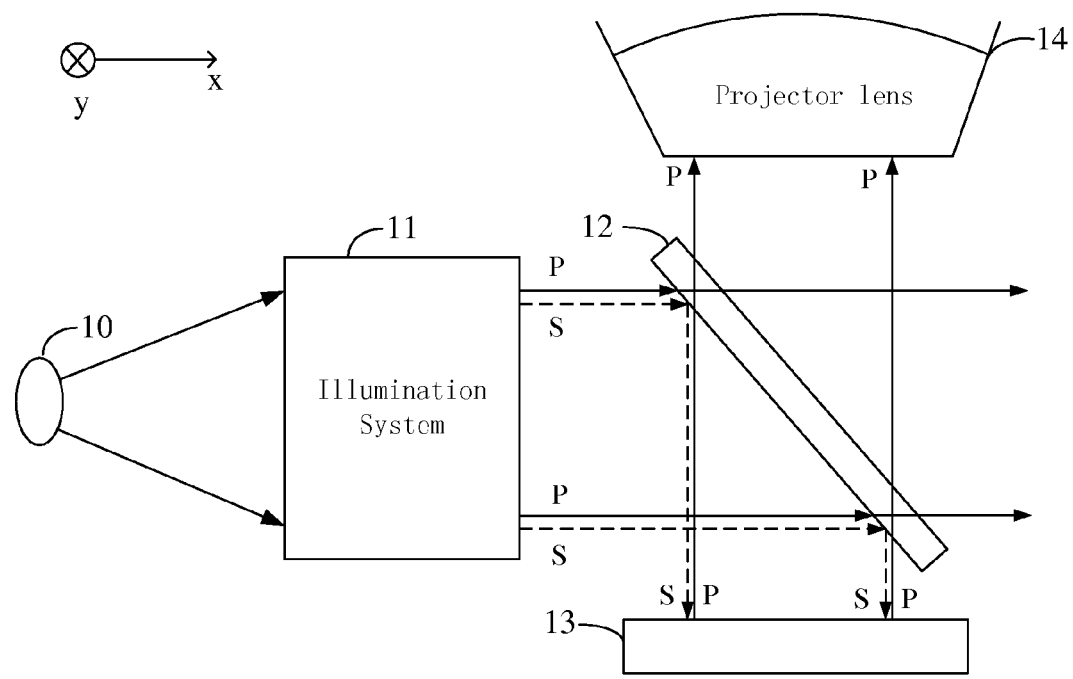
FIG. 1 is a schematical view of a projection display device in prior art.
Figure 2:
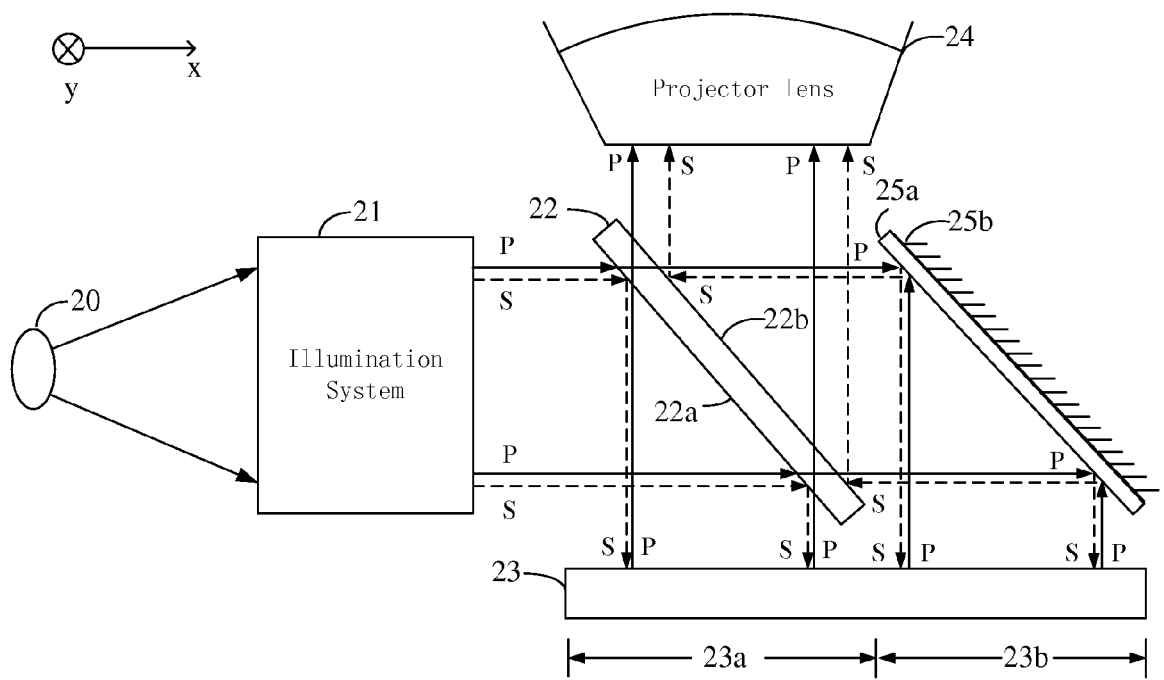
FIG. 2 is a schematical view of a projection display device in the first embodiment.

FIG. 2 schematically shows a projection display device of the first embodiment. The projection display device includes a light source device 20, an illumination system 21, a PBS 22, a display panel 23, a projector lens 24, a quarter-wave plate 25a and a reflector 25b. The quarter-wave plate 25a is located on the surface of the reflector 25b. The quarter-wave plate 25a and the reflector 25b together compose light recycling components. The display panel 23 is set along the first direction (x-axis), including a first region 23a and a second region 23b. The first region 23a and the second region 23b are used to generate a first image information and a second image information respectively. Optionally, the first display panel and the second display panel, which are used to generate the first image information and the second image information, can be independent display panels. The light recycling components and the second region 23b compose a light recycling device, which is used to transform a first type parallel polarized light transmitted by the PBS 22 to a second type parallel polarized light carrying a second image information. The light recycling device then reversely transmits the second type parallel polarized light which carries the second image information to a second surface of the PBS 22. "Reversely transmit" means that the transmission direction of the second type parallel polarized light is just opposite to the transmission direction of the first type parallel polarized light transmitted by the PBS 22.

Preferably, the light source device 20 in this embodiment is LED (Light Emitting Diode), which emits white light.

In this embodiment, the illumination system 21 is used to transform the white light emitted by the light source device 20 to parallel light. The parallel light passes along a first direction (x-axis), which is then transformed by a PBS to parallel polarized light. The parallel polarized light includes a first type parallel polarized light and a second type parallel polarized light. The first type parallel polarized light is p-polarized light, while the second type parallel polarized light is s-polarized light. It should be noted that although in practical applications the p-polarized light and the s-polarized light can not be strictly parallel to the first direction (x-axis), the light out of the illumination system 21 after fine tuning is almost parallel light.

Preferably, the display panel 23 is LCOS (an LCOS display panel), which generates image information. The display panel 23 receives the parallel polarized light and reflects it after transforming its type (e.g. first type to second type or vise versa). In this embodiment, the first region 23a of the display panel 23 receives the s-polarized light, transforms it to a p-polarized light which carries the first image information, and reflects this p-polarized light. The second region 23b receives the s-polarized light, transforms it to a p-polarized light which carries the second image information, and reflects this p-polarized light.

The PBS 22 could be a metal grating or PBS film, in this embodiment, it is a metal grating. The PBS 22 is located between the projector lens 24 and the first region 23a, the PBS 22 forms 45 degrees with respect to the first direction (x-axis). The PBS 22 includes a first surface 22a and a second surface 22b parallel to each other. The PBS 22 transmits the first type parallel polarized light and reflects the second type parallel polarized light. In this embodiment, it reflects the s-polarized light and transmits the p-polarized light. The s-polarized light of the parallel polarized light is reflected by the first surface 22a to the first region 23a, and then transformed by the first region 23a of the display panel 23 to a p-polarized light. The p-polarized light is then reflected to the PBS 22. After passing through the first surface 22a and the second surface 22b, the p-polarized light is incident into the incident surface of the projector lens 24. The p-polarized light of the parallel polarized light passes through the first surface 22a and the second surface 22b, and further into the light recycling components.

The projector lens 24 transmits light that incident into its incident surface. In this embodiment, the incident surface of the projector lens 24 faces the first region 23a of the display panel 23.

It should be noted that in other embodiments, the PBS 22 could reflect p-polarized light and transmit s-polarized light. In this case, the display panel 23 receives p-polarized light and transforms it to s-polarized light carrying image information. The display panel 23 then reflects the s-polarized light to the PBS 22. The s-polarized light passes through the PBS 22 further into the incident surface of the projector lens 24.

In this embodiment, the light recycling components include reflector 25b and quarter-wave plate 25a located on the surface of the reflector 25b. The reflector 25b and the quarter-wave plate 25a are parallel to the PBS 22, and form 45 degrees with respect to the first direction (x-axis). The incident surface of the reflector is positioned towards the second region 23b. The p-polarized light of the parallel polarized light passes through the PBS 22 and is incident into the quarter-wave plate 25a. Because of the reflection of the reflector 25b, the p-polarized light passes through the quarter-wave plate 25a twice (equivalent to one time through a half-wave plate). The p-polarized light is transformed to an s-polarized light. The s-polarized light is incident into the second region 23b of the display panel 23. The second region 23b transforms the s-polarized light to a p-polarized light carrying the second image information, and reflects it back to the light recycling components. Again, the p-polarized light passes through the quarter-wave plate 25a twice and is transformed to an s-polarized light carrying the second image information. The s-polarized light carrying the second image information is incident into the second surface 22b of the PBS 22. The second surface 22b reflects the s-polarized light to the projector lens 24.

In this embodiment, the dimensions of incident surface of the display panel 23 are: length=8.8 mm (along the first direction of x-axis), in which the first region 23a and the second region 23b each has a length of 4.4 mm and a width of 6.6 mm (along the second direction of y-axis, pointing inside the paper). The dimension of incident surface of the reflector 25b is 6.3 mm×6.6 mm, in which 6.6 mm is the length along the second direction (y-axis) and 6.3 mm is the length of the other side.

The first image information generated by the first region 23a and the second image information generated by the second region 23b could be identical. Since the p-polarized light transmitted by the PBS 22 has been recycled by the light recycling components and reflected to the incident surface of the projector lens 24, the light utilization efficiency is improved remarkably, thus strengthening the quality of projected images.

The first image information generated by the first region 23a and the second image information generated by the second region 23b could be left-eye image and right-eye image separately. The light incident into the incident surface of the projector lens 24 is the combination of the left-eye image and the right-eye image, which achieves 3D effect.

Figure 3:
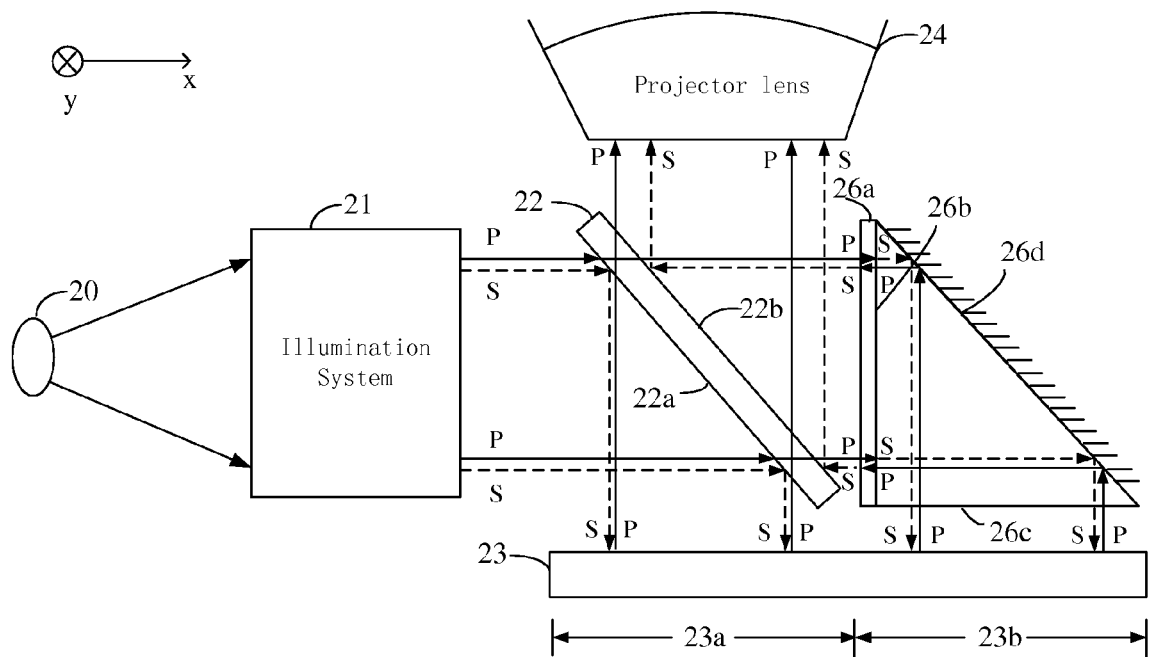
FIG. 3 is a schematical view of a projection display device in the second embodiment.

FIG. 3 schematically shows a projection display device of the second embodiment of this invention. This projection display device differs from the one in FIG. 2 only in light recycling components. Light recycling components in the second embodiment include a 45-degree right-angle prism, which has a first right-angle surface 26b, a second right-angle surface 26c and a hypotenuse surface 26d. The first right-angle surface 26b and the second right-angle surface 26c are transmitting surfaces and the hypotenuse surface 26d is a reflecting surface. The second right-angle surface 26c is parallel to the first direction (x-axis). The hypotenuse surface 26d is parallel to the PBS 22, and forms 45 degrees with respect to the first direction (x-axis). A half-wave plate 26a is located on the first right-angle surface 26b. A p-polarized light transmitted by the PBS 22 is incident into the first right-angle surface 26b. The half-wave plate 26a transforms the p-polarized light to an s-polarized light. The s-polarized light is then reflected by the hypotenuse surface 26d to the second region 23b of the display panel 23. The second region 23b transforms the s-polarized light to a p-polarized light carrying a second image information. The p-polarized light carrying the second image information is then reflected to the second right-angle surface 26c of the 45-degree right-angle prism, and reflected by the hypotenuse surface 26d. After passing through the half-wave plate 26a, the p-polarized light is transformed to an s-polarized light carrying the second image information. The s-polarized light carrying the second image information is incident into the second surface 22b of the PBS 22, and is reflected to the incident surface of the projector lens 24.

Figure 4:
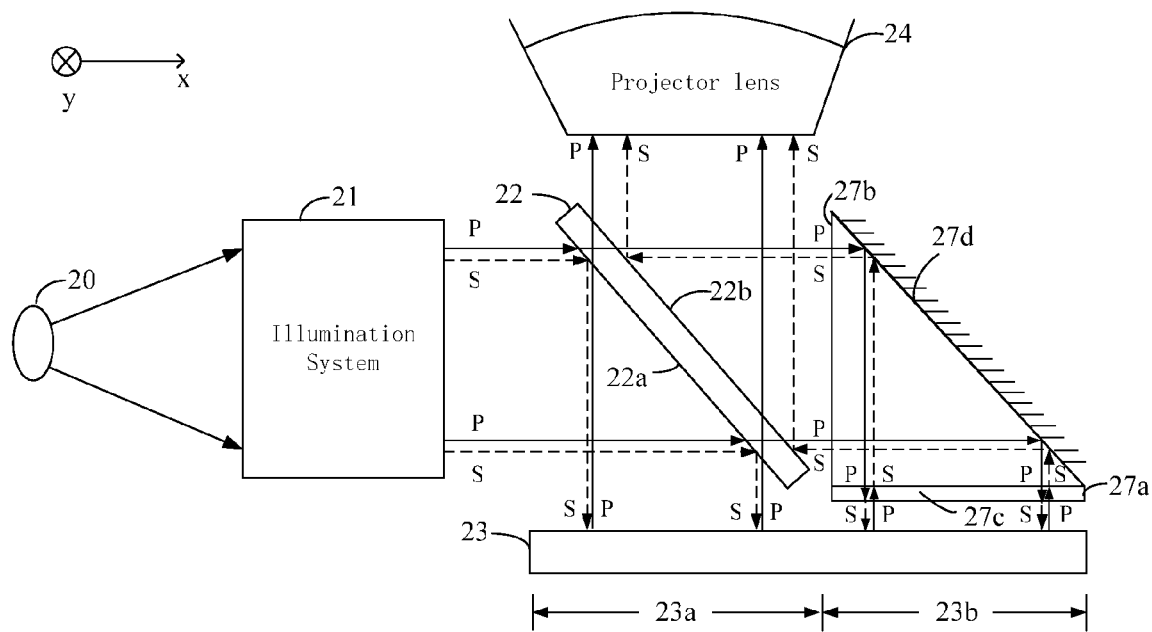
FIG. 4 is a schematical view of a projection display device in the third embodiment.

FIG. 4 schematically shows a projection display device of the third embodiment of this invention. This projection display device differs from the one in FIG. 2 only in light recycling components. Light recycling components in the third embodiment include a 45-degree right-angle prism, which has a first right-angle surface 27b, a second right-angle surface 27c and a hypotenuse surface 27d. The first right-angle surface 27b and the second right-angle surface 27c are transmitting surfaces, and the hypotenuse surface 27d is a reflecting surface. The second right-angle surface 27c is parallel to the first direction (x-axis), and the hypotenuse surface 27d is parallel to the PBS 22. The hypotenuse surface 27d forms 45 degrees with respect to the first direction (x-axis). A half-wave plate 27a is located on the second right-angle surface 27c. A p-polarized light transmitted by the PBS 22 is incident into the first right-angle surface 27b. The hypotenuse surface 27d reflects the p-polarized light, and the half-wave plate 27a transforms it to an s-polarized light. The s-polarized light passes to the second region 23b of the display panel 23. The second region 23b transforms the s-polarized light to a p-polarized light carrying a second image information, and reflects the p-polarized light to the half-wave plate 27a. The p-polarized light is then transformed to an s-polarized light carrying the second image information. The s-polarized light carrying the second image information is reflected by the hypotenuse surface 27d. The s-polarized light then passes through the first right-angle surface 27b and is incident into the second surface 22b of the PBS 22. The s-polarized light is finally reflected to the incident surface of the projector lens 24.

The dimensions of the first right-angle surface of the 45-degree right-angle prism in FIG. 3 and FIG. 4 are: length perpendicular to the first direction (x-axis)=4.4 mm, length along the second direction (y-axis)=6.6 mm.

The dimensions of the second right-angle surface of the 45-degree right-angle prism in FIG. 3 and FIG. 4 are: length along the first direction (x-axis)=4.4 mm, length along the second direction (y-axis)=6.6 mm.

It should be noted that the quarter-wave plate and the half-wave plate used in the above embodiments are able to transform polarized light having a wavelength range of 380 nm to 720 nm, which means being able to transform the type of all polarized light in the visible wavelength range, thus further improving the light utilization efficiency. The distance between the light recycling components and the PBS should be as short as possible, to minimize the loss of transmission of light and to improve the light utilization efficiency. If the PBS is PBS film, the PBS film should be as thin as possible, to minimize the loss of transmission of light and to improve the light utilization efficiency.

In conclusion, projection display devices in this invention use the light recycling device to recycle the polarized light transmitted by the PBS, to transform it to a polarized light carrying the second image information, and to reflect the polarized light to the incident surface of the projector lens. In this way, the projection display devices in this invention improve the light utilization efficiency and image quality.

Furthermore, the images generated by the first display panel (the first region) and by the second display panel (the second region) of the present invention can be the same, which means the polarized light recycled by the light recycling device strengthened the images. Also, the images generated by the first display panel and by the second display panel can be the left-eye image and right-eye image respectively. Therefore, the final image projected by the projector lens is the combination of the two images, thus achieving the effect of three-dimensional display.

In the above embodiments, a 45-degree-angle is formed between the PBS and x-axis. In other embodiments, the angle formed between the PBS and x-axis as well as the incident angle to the PBS surface will be different according to different types of PBS.

Although the present invention has been illustrated and described with reference to the preferred embodiments of the present invention, those ordinary skilled in the art shall appreciate that various modifications in form and detail may be made without departing from the spirit and scope of the invention.

The invention claimed is:

1. A projection display device comprising:
a first display panel;
a polarization beam splitter (PBS) having a first surface and a second surface opposite to each other;
a light recycling device; and
a projector lens;
wherein an incident surface of the projector lens faces the first display panel, the PBS being located between the projector lens and the first display panel;
wherein the PBS is adapted to transmit a first type parallel polarized light and to reflect a second type parallel polarized light;
wherein the first display panel is adapted to transform the second type parallel polarized light, which is reflected by the first surface of the PBS, to the first type parallel polarized light which carries a first image information, and is adapted to reflect the first type parallel polarized light, which carries the first image information, to the first surface of the PBS;
wherein the light recycling device is adapted to transform the first type parallel polarized light, which is transmitted by the PBS, to the second type parallel polarized light which carries a second image information, and is adapted to reversely transmit the second type parallel polarized light to the second surface of the PBS, and wherein the light recycling device includes light recycling components and a second display panel, the light recycling components being adapted to transform the first type parallel polarized light, which is transmitted by the PBS, to the second type parallel polarized light, and being adapted to reflect the second type parallel polarized light to the second display panel, the second display panel being adapted to transform the second type parallel polarized light to the first type parallel polarized light which carries the second image information, and being adapted to reflect the first type parallel polarized light to the light recycling components, and the light recycling components being adapted to transform the first type parallel polarized light, which carries the second image information, to the second type parallel polarized light which carries the second image information, and being adapted to reflect the second type parallel polarized light to the second surface of the PBS; and
wherein the projector lens is adapted to receive the first type parallel polarized light, which is transmitted by the PBS and carries the first image information, and the second type parallel polarized light, which is reflected by the PBS and carries the second image information.

2. The projection display device as claimed in claim 1, wherein the light recycling components include a reflector and a quarter-wave plate located on the surface of the reflector, the reflector and the quarter-wave plate being parallel to the PBS, and an incident surface of the reflector facing the second display panel.

3. The projection display device as claimed in claim 2, wherein the first display panel and the second display panel are two parts of a same display panel.

4. The projection display device as claimed in claim 2, wherein the first display panel and the second display panel are liquid crystal on silicon (LCOS) panels.

5. The projection display device as claimed in claim 1, wherein the light recycling components include a right-angle prism having a first right-angle surface, a second right-angle surface and a hypotenuse surface, the first right-angle surface and the second right-angle surface being transmitting surfaces, the hypotenuse surface being a reflecting surface, the second right-angle surface being parallel to the second display panel, the hypotenuse surface being parallel to the PBS, a half-wave plate being located on the first right-angle surface, and the first type parallel polarized light transmitted by the PBS being incident into the first right-angle surface.

6. The projection display device as claimed in claim 5, wherein the first display panel and the second display panel are two parts of a same display panel.

7. The projection display device as claimed in claim 5, wherein the first display panel and the second display panel are liquid crystal on silicon (LCOS) panels.

8. The projection display device as claimed in claim 1, wherein the light recycling components include a right-angle prism having a first right-angle surface, a second right-angle surface and a hypotenuse surface, the first right-angle surface and the second right-angle surface being transmitting surfaces, the hypotenuse surface being a reflecting surface, the second right-angle surface being parallel to the second display panel, the hypotenuse surface being parallel to the PBS, a half-wave plate being located on the second right-angle surface, and the first type parallel polarized light transmitted by the PBS being incident into the first right-angle surface.

9. The projection display device as claimed in claim 8, wherein the first display panel and the second display panel are two parts of a same display panel.

10. The projection display device as claimed in claim 8, wherein the first display panel and the second display panel are liquid crystal on silicon (LCOS) panels.

11. The projection display device as claimed in claim 1, wherein the first display panel and the second display panel are two parts of a same display panel.

12. The projection display device as claimed in claim 1, wherein the first display panel and the second display panel are liquid crystal on silicon (LCOS) panels.

13. The projection display device as claimed in claim 1, wherein the first image information and the second image information are identical.

14. The projection display device as claimed in claim 1, wherein the first image information is left-eye image, and the second image information is right-eye image.

15. The projection display device as claimed in claim 1, wherein the projection display device also comprises a light source device and an illumination system, the illumination system transforming natural light, which is emitted by the light source device, to parallel light.

16. The projection display device as claimed in claim 1, wherein the PBS is a metal grating, a PBS film, a PBS prism or a PBS plate.

* * * * *